United States Patent [19]
Henkel et al.

[11] Patent Number: 5,897,786
[45] Date of Patent: Apr. 27, 1999

[54] METHOD AND APPARATUS FOR DETERMINING THICKNESS OF A CHARGE WALL BEING FORMED IN A CENTRIFUGAL MACHINE

[75] Inventors: Donald John Henkel, Loveland; David John Tack, Middletown, both of Ohio

[73] Assignee: The Western States Machine Company, Hamilton, Ohio

[21] Appl. No.: 08/823,808

[22] Filed: Mar. 24, 1997

[51] Int. Cl.$^6$ .......................... B01D 17/12; B01D 17/038; G01H 5/00
[52] U.S. Cl. .................................. 210/744; 73/1; 73/597; 210/86; 210/360.1; 210/787; 494/10
[58] Field of Search .......................... 210/86, 104, 360.1, 210/380.1, 744, 781, 787, 138; 422/72; 73/597, 1.01; 494/1, 10

[56] References Cited

U.S. PATENT DOCUMENTS

| | | | |
|---|---|---|---|
| 3,420,374 | 1/1969 | Umeda | 210/86 |
| 3,446,431 | 5/1969 | Marchal et al. | |
| 3,559,808 | 2/1971 | O'Conor et al. | 210/86 |
| 4,229,298 | 10/1980 | Bange | 210/787 |
| 4,437,332 | 3/1984 | Pittaro | |
| 4,522,068 | 6/1985 | Smith | 73/597 |
| 4,836,934 | 6/1989 | Homer | 210/771 |
| 4,888,989 | 12/1989 | Homer | |
| 5,009,104 | 4/1991 | Johnson | 73/597 |
| 5,040,419 | 8/1991 | Allaire et al. | 73/597 |
| 5,052,227 | 10/1991 | Le Floc'H et al. | |
| 5,093,010 | 3/1992 | Schilp | 210/744 |
| 5,166,910 | 11/1992 | Batzle et al. | 73/597 |
| 5,253,529 | 10/1993 | Lenormand et al. | 422/72 |
| 5,254,241 | 10/1993 | Bange et al. | 210/86 |
| 5,601,704 | 2/1997 | Salem et al. | 210/86 |

FOREIGN PATENT DOCUMENTS

| | | | |
|---|---|---|---|
| 59-92344 | 5/1984 | Japan | 210/86 |

*Primary Examiner*—Joseph W. Drodge
*Attorney, Agent, or Firm*—Killworth, Gottman, Hagan & Schaeff, L.L.P.

[57] ABSTRACT

An ultrasonic probe is mounted in a centrifugal machine within close proximity to a maximum charge wall which is to be formed within a charge basket of the centrifugal machine. The probe comprises a tubular member which extends from an upper portion of an outer shell which surrounds the basket into the basket. A sensing head of the probe includes an ultrasonic transmitter and receiver which are mounted within a capsule formed of ultrasonic energy and vibration damping material. The transmitter and receiver are directed toward an inner surface of the charge basket of the centrifugal machine to monitor build up of a charge wall within the basket by directing bursts or pulses of ultrasonic energy toward the inner surface of the basket and receiving reflections or echoes of the pulses which are reflected from the charge wall building within the basket. The centrifugal machine is then controlled in accordance with the ultrasonically measured thickness of the building charge wall to more accurately and consistently fully load the basket with little or no underfill or overfill of the basket.

32 Claims, 4 Drawing Sheets

METHOD AND APPARATUS FOR DETERMINING THICKNESS OF A CHARGE WALL BEING FORMED IN A CENTRIFUGAL MACHINE

BACKGROUND OF THE INVENTION

The present invention relates in general to heavy cyclical centrifugal machines and, more particularly, to a method and apparatus for determining the thicknesses of charge walls being formed along the inner sidewalls of rotating centrifugal baskets of such machines by charge material flowing into the baskets by using ultrasonic energy. While the present invention is generally applicable to such machines, it will be described herein with reference to heavy cyclical centrifugal machines used for manufacturing and refining sugar.

A problem encountered when operating heavy cyclical centrifugal machines of the type used to manufacture and refine sugar is the inaccurate loading of the centrifugal baskets of the machines. These baskets should be fully loaded to their maximum capacities to maximize the productivity of the machines. Unfortunately, underloading the baskets results in reduced production and, when striving for maximum loading, the baskets are often overloaded so that charge material is lost from the basket resulting in waste even though production is increased. Variations in the loading properties of the charge material, massecuite for sugar manufacture and refining, can effect the efficiency of cycle to cycle centrifugal processing. These variations often occur from one batch of charge material to another and even occur between different portions of a single batch of charge material. Since these variations in loading properties are difficult or impossible to control, it has been an ongoing goal in the industry to control the loading operations of centrifugal machines such that the machines operate with maximum charge in spite of the charge material variations.

To control loading a centrifugal machine, measurements of the volume of the charge as it is being loaded into the machines have been made. For example, mechanical charge wall thickness measuring devices have been used to determine the thickness of the charge wall and thereby the volume of material in the charge basket of a machine, see U.S. Pat. Nos. 2,727,630; 3,011,641; 3,079,046; and, 3,141, 846. A capacitance probe has been used also to determine wall thickness and hence the volume of material in the charge basket of a centrifugal machine, see U.S. Pat. No. 4,229,298. The mechanical and capacitance charge wall thickness measuring devices have been used with a variety of loading gates and loading gate control processes.

For example, the loading gate may be progressively closed as the charge measuring device indicates progressively increasing charge thickness in the centrifugal basket. When the charge wall approaches the desired thickness, the loading gate has moved to and is maintained at a pinched or largely closed position. When the final wall thickness is actually reached, the loading gate is quickly closed so that only a limited amount of material can flow into the basket as it closes from its pinched position to its fully closed position. The amount of material entering the basket during final closure of the loading gate from its pinched position to its fully closed position is insufficient to appreciably deviate from the desired final charge volume.

In another gate control process, the loading gate may be closed rapidly from its full open position to a pinched position and thereafter fully closed when the final wall thickness or volume has been reached. In yet another gate control process, the loading gate can be rapidly moved from its full open position to its fully closed position upon sensing the desired final wall thickness.

In still another gate control process which is currently enjoying substantial commercial success, when the charge wall approaches the desired thickness, the loading gate is rapidly moved to a pinched position which is a proportion of a selectable full open position from which it is to be closed, see U.S. Pat. No. 5,254,241 which is incorporated herein by reference. When the final wall thickness is actually reached, the loading gate is quickly closed so that only a limited amount of material can flow into the basket as it closes from its pinched position to its fully closed position.

The variety of loading gate control processes have been implemented, at least in part, to compensate for limitations in the measuring abilities of mechanical and capacitive charge wall thickness measuring devices. As should be expected, mechanical charge wall thickness measuring devices are prone to becoming fouled by the charge materials flowing into a basket of a centrifugal machine. While capacitive charge wall thickness measuring devices are a distinct improvement over mechanical devices, the sensitivity of capacitive devices is proportional to the inverse of the sensing distance so that their resolution is greatly diminished at larger measuring distances.

Accordingly, there is a need for an improved charge wall sensing device which is less prone to being fouled than mechanical measuring devices and provides improved sensitivity in comparison to capacitive measuring devices, particularly at larger measuring distances.

SUMMARY OF THE INVENTION

This need is met by the invention of the present application wherein an ultrasonic probe is mounted in a centrifugal machine within close proximity to a maximum charge wall which is to be formed within a charge basket of the centrifugal machine. The probe comprises a tubular member, which extends from an upper portion of an outer shell which surrounds the basket, into the basket. A sensing head of the probe includes an ultrasonic transmitter and receiver which are mounted within a capsule formed of ultrasonic energy and vibration damping material. The transmitter and receiver are directed toward an inner surface of the charge basket of the machine to monitor build up of a charge wall within the basket by directing bursts of pulses of ultrasonic energy toward the inner surface of the basket and receiving reflections or echoes of the pulses which are reflected from the charge wall building within the basket. The centrifugal machine is then controlled in accordance with the ultrasonically measured thickness of the building charge wall to more accurately and consistently fully load the basket with little or no underfill or overfill of the basket.

In accordance with one aspect of the present invention, a method of determining the thickness of a charge wall being formed in a charge space along the inner sidewall of a rotating centrifugal basket of a centrifugal machine by charge material flowing into the basket comprises positioning an ultrasonic probe within the basket and activating the ultrasonic probe to direct ultrasonic energy toward a charge wall being formed along the inner sidewall of the basket. The ultrasonic energy reflected from the charge wall is received and a round trip time is measured for the ultrasonic energy from when the ultrasonic energy is emitted from the probe to when the ultrasonic energy is received back by the probe after reflection from the charge wall. The round trip time of the ultrasonic energy is then utilized to determine the thickness of the charge wall. Preferably, the ultrasonic probe is operated at a frequency of approximately 200 kHz and is located closely adjacent to a maximum thickness for the charge wall.

In accordance with another aspect of the present invention, apparatus for determining the thickness of a charge wall being formed in a charge space along the inner sidewall of a centrifugal basket rotating within a curb structure of a centrifugal machine by charge material flowing into the basket comprises a probe having a proximal end connected to the curb structure and a distal end extending into the basket. The distal end of the probe is spaced from the charge space and an ultrasonic transmitter is mounted in the distal end of the probe and directed toward the inner sidewall. An ultrasonic receiver is also mounted in the distal end of the probe and directed toward the inner sidewall. A probe control circuit provides for energizing the transmitter to transmit bursts of ultrasonic energy toward the inner sidewall, for sensing receipt of the bursts of ultrasonic energy reflected by the charge space and received by the receiver, for determining the time interval between transmission and receipt of the bursts of ultrasonic energy, and for determining a distance from the probe to the charge wall corresponding to the time interval.

The ultrasonic transmitter and the ultrasonic receiver are spaced from one another within the probe and are mounted in a vibration damping material. The vibration damping material may comprise a mounting capsule defining first and second cavities for receiving the ultrasonic transmitter and the ultrasonic receiver, respectively, and a third decoupling cavity interposed between the first and second cavities. The probe is mounted at a distance from the inner sidewall which is less than a radius of the basket, for example, in one embodiment, the probe is mounted at a distance of approximately 2.0 inches from a maximum charge wall to be formed in the a charge space of the rotating centrifugal basket.

In accordance with yet another aspect of the present invention, apparatus for determining the thickness of a charge wall being formed in a charge space along the inner sidewall of a centrifugal basket rotating within a curb structure of a centrifugal machine by charge material flowing into the basket comprises a probe having a proximal end connected to the curb structure and a distal end extending into the basket. The probe comprises a tubular body extending between the proximal end and the distal end of the probe. An ultrasonic transmitter and an ultrasonic receiver are mounted in the distal end of the probe and are directed toward the inner sidewall. A probe control circuit is provided for energizing the transmitter to transmit bursts of ultrasonic energy toward the inner sidewall, for sensing receipt of the bursts of ultrasonic energy reflected by the charge space and received by the receiver, for determining the time interval between transmission and receipt of the bursts of ultrasonic energy, and for determining a distance from the probe to the charge wall corresponding to the time interval.

The probe may further comprise a sleeve secured to the tubular body at the distal end of the probe and the ultrasonic transmitter and the ultrasonic receiver are mounted within the sleeve. Preferably, for this embodiment, the tubular body and the sleeve define aligned apertures therethrough and the ultrasonic transmitter and the ultrasonic receiver are mounted within the aligned apertures.

It is, thus, an object of the present invention to provide a method and apparatus for determining the thicknesses of charge walls being formed along the inner sidewalls of rotating centrifugal baskets of centrifugal machines by using ultrasonic energy; to provide a method and apparatus for determining the thicknesses of charge walls being formed along the inner sidewalls of rotating centrifugal baskets of centrifugal machines by means of ultrasonic probes which are mounted closely adjacent the positions maximum thickness charge walls would occupy within the machines; and, to provide a method and apparatus for determining the thicknesses of charge walls being formed along the inner sidewalls of rotating centrifugal baskets of centrifugal machines with probes including ultrasonic transmitters and receivers which are sealingly mounted within vibration damping material forming capsules which are mounted in sensing heads of the probes.

Other objects and advantages of the invention will be apparent from the following description, the accompanying drawings and the appended claims.

DETAILED DESCRIPTION OF THE INVENTION

Figure 1:
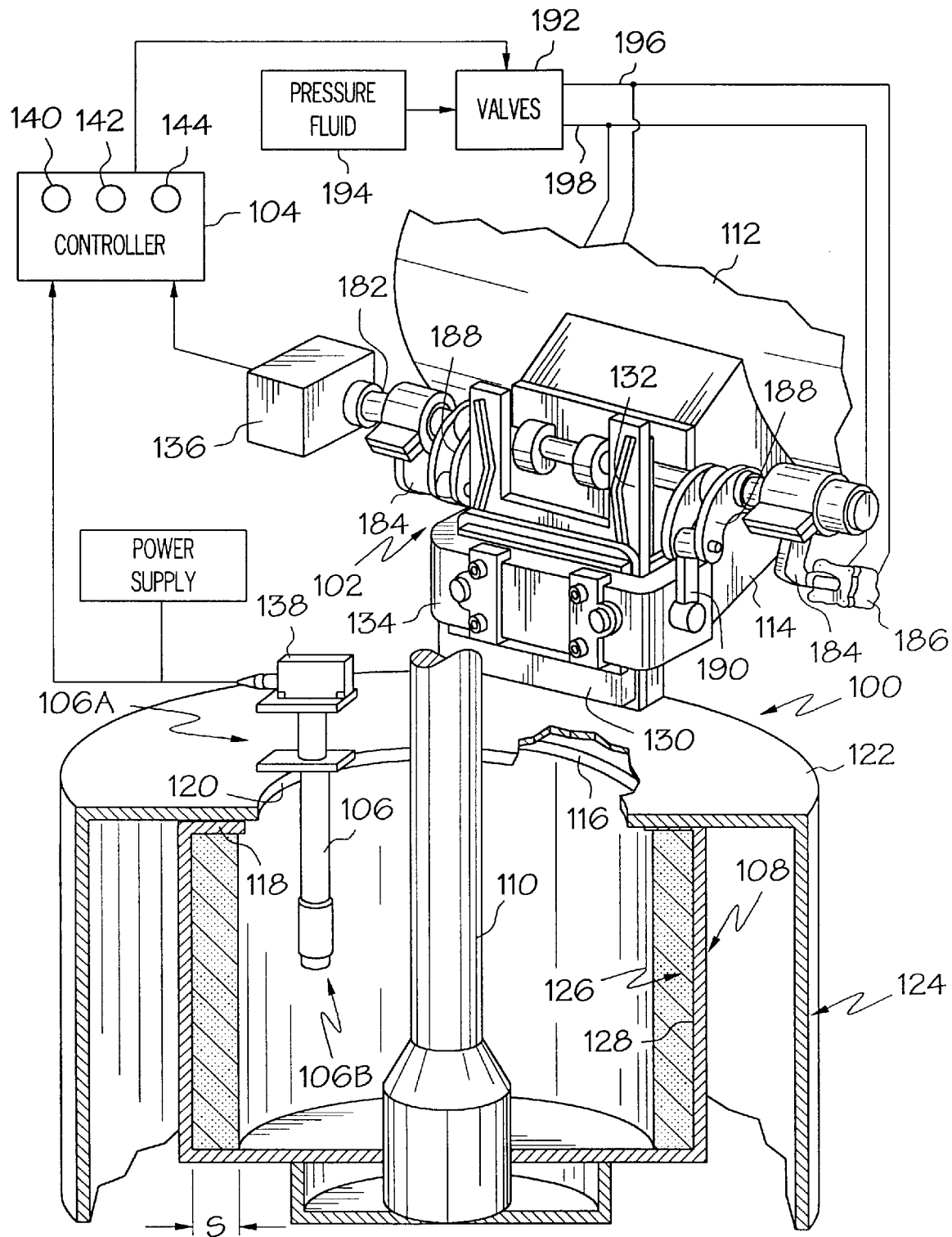
FIG. 1 is a partially sectioned, perspective schematic view of portions of a cyclic centrifugal machine and a loading gate for delivering charge material into a basket of the machine schematically illustrating apparatus operable in accordance with the present invention for determining the thickness of a charge wall being formed in the centrifugal machine.

While the present invention is applicable to centrifugal machines in general, it will be described herein with reference to heavy cyclical centrifugal machines used for manufacturing and refining sugar. For example, FIG. 1 schematically illustrates portions of such a heavy cyclical centrifugal machine 100, a loading gate assembly 102 and a loading controller 104 operable in response to signals generated by an ultrasonic probe 106 of the present invention.

The centrifugal machine 100 includes a perforated cylindrical basket 108 carried on a spindle 110 that is suspended from a gyratory head (not shown) for gyratory motion and is rotated in a conventional manner by a rotary prime mover (not shown). The spindle 110 and basket 108 are driven at high centrifuging speeds for processing a load of charge material in the basket 108 and at lower speeds during other operating phases of cyclic machine operation.

Charge material, such as massecuite for sugar manufacture and refining, is delivered into the basket 108 from a storage or supply tank 112 by the loading gate assembly 102 mounted at the mouth of a spout 114 extending from the tank 112. The charge material flowing from the loading gate assembly 102 passes into the basket 108 through a central opening 116 in a top 118 of the basket 108 reaching the basket 108 through a central opening 120 in a top 122 of a cylindrical curb structure including an outer wall 124 which surrounds the basket 108.

The charge material is made up of both solid and liquid components and is delivered into the basket 108 while the basket 108 is rotating at a relatively low speed which is suitable for forming a charge wall 126. The charge wall 126 is formed in a charge space S along an inner sidewall 128 of the basket 108 by centrifugal force. When the charge is centrifuged at higher operating speeds, liquid is expelled from the solids of the charge wall 126 with the liquid passing through screens and perforations (not shown) in the basket 108.

The loading gate assembly 102 includes a movable gate member 130 slidable along its rear face to and from open positions on a facing plate 132 mounted about a mouth of the spout 114. A crosshead member 134 extends across the front face of the gate member 130 to support a rear face of the gate member 130 against the facing plate 132 and to aid in sliding the gate member 130 to and from its open positions as described more particularly in U.S. Pat. No. 2,801,035 which is incorporated herein by reference.

In a typical basket loading operation, which is performed for each cycle of operation of the centrifugal machine 100, the gate member 130 is first moved upward to a selectable full open position. The full open position of the gate member 130 enables relatively rapid flow of charge material through the loading gate assembly 102 for quickly filling the basket 108 nearly up to the desired final volume for fully loading the basket 108. In a preferred mode of operation, the gate member 130 is then moved downward to a flow pinching position which is a proportion of the selected full open position. The pinch position slows the flow of charge material into the basket 108 during a final loading stage for completely filling the basket 108. This loading operation is described more particularly in referenced U.S. Pat. No. 5,254,241.

The controller 104 receives input signals from an encoder 136 and from probe control circuitry within a probe control circuit housing 138 of the ultrasonic probe 106 and also from operator settable controls 140, 142, 144 associated with the controller 104. An operator of the centrifugal machine 100 can set an appropriate final thickness for the charge wall 126 to be loaded into the machine 100 by the settable control 140. The settable control 142 can be adjusted to set a gate full open position which is appropriate for the charge material being loaded into the machine 100. The settable control 144 is adjusted to set a desired gate pinch position which preferably is a proportion of the gate full open position.

Ultrasonic sensors are well known and have been used for many years for measuring distances from such sensors to objects by transmitting ultrasonic energy pulses toward the objects, receiving reflections or echoes of the ultrasonic energy pulses from the objects and measuring the times it takes the pulses to travel from transmitters to receivers of the sensors. The transmitter and receiver of an ultrasonic sensor typically are either two piezoelectric devices or can be the same piezoelectric device used to both transmit and receive ultrasonic pulses.

Ultrasonic sensors are able to make highly accurate measurements over substantial distances and they are non-contact so that they have no wearing parts. In addition, ultrasonic sensors have highly linear measuring characteristics over their measurement range. While these attributes are ideal for measuring the thickness of a charge wall being formed in a centrifugal machine, prior to this time there have been no ultrasonic sensors used in centrifugal machines. The problems with ultrasonic sensors, which have heretofore not been overcome, relate to the inherent nature of sound fields generated by ultrasonic sensors and common operating characteristics of ultrasonic sensors.

In particular, the sound fields generated by ultrasonic sensors commonly are not highly collimated and ultrasonic sensors include "deadbands", i.e. spaces directly in front of the sensors that can not be used for measurement, which typically extend for relatively long distances in front of the sensors. Ultrasonic sensors having low sound field collimation and long deadbands can not be fitted within the close quarters of a centrifugal machine and successfully operated to measure the rapidly moving surface of a charge wall building within the centrifugal machine.

A long sound path which results from a long deadband requires that the sound reflection surface, for example the outer surface of a building charge wall in a centrifugal machine, be a substantial distance from an ultrasonic sensor detecting the surface. Accordingly, the sensor must be mounted a substantial distance from the charge wall it is measuring which results in the introduction of many potential error factors including: the reception of spurious sound echoes from surfaces other than that being monitored by the sensor; increased measurement error due to the change in the speed of sound with temperature and other ambient conditions within a centrifugal machine; and, increased unreliability due to windage created by operation of the centrifuge.

In addition, for very long sound paths, straight-line paths may be impossible due to the size of the centrifuge thus requiring sound reflectors. Long sound paths requiring sound reflectors further increase the possibility of spurious echoes from objects located adjacent the sound path particularly if an ultrasonic sensor having low field collimation is used. Attempts to overcome these problems by improving sound field collimation have been attempted by increasing the vibrating surface area of a transmitter and/or by increasing the sound frequency. Unfortunately, the resulting ultrasonic sensors typically can not tolerate water condensation on the vibration surface making them impractical for centrifuge application which typically employ washing and steaming processing operations.

Figure 2:
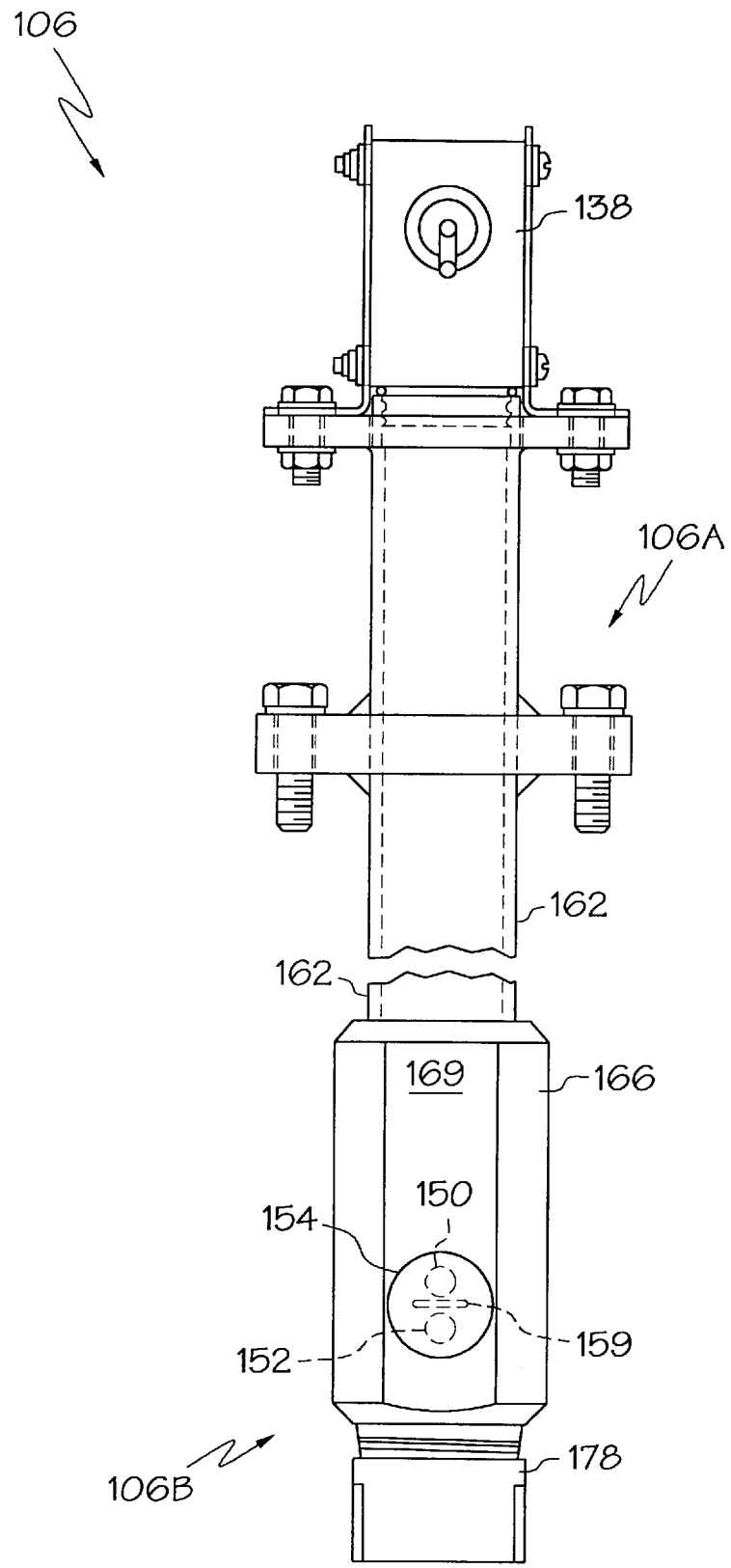
FIG. 2 is a front view of an ultrasonic probe of FIG. 1.
Figure 3:
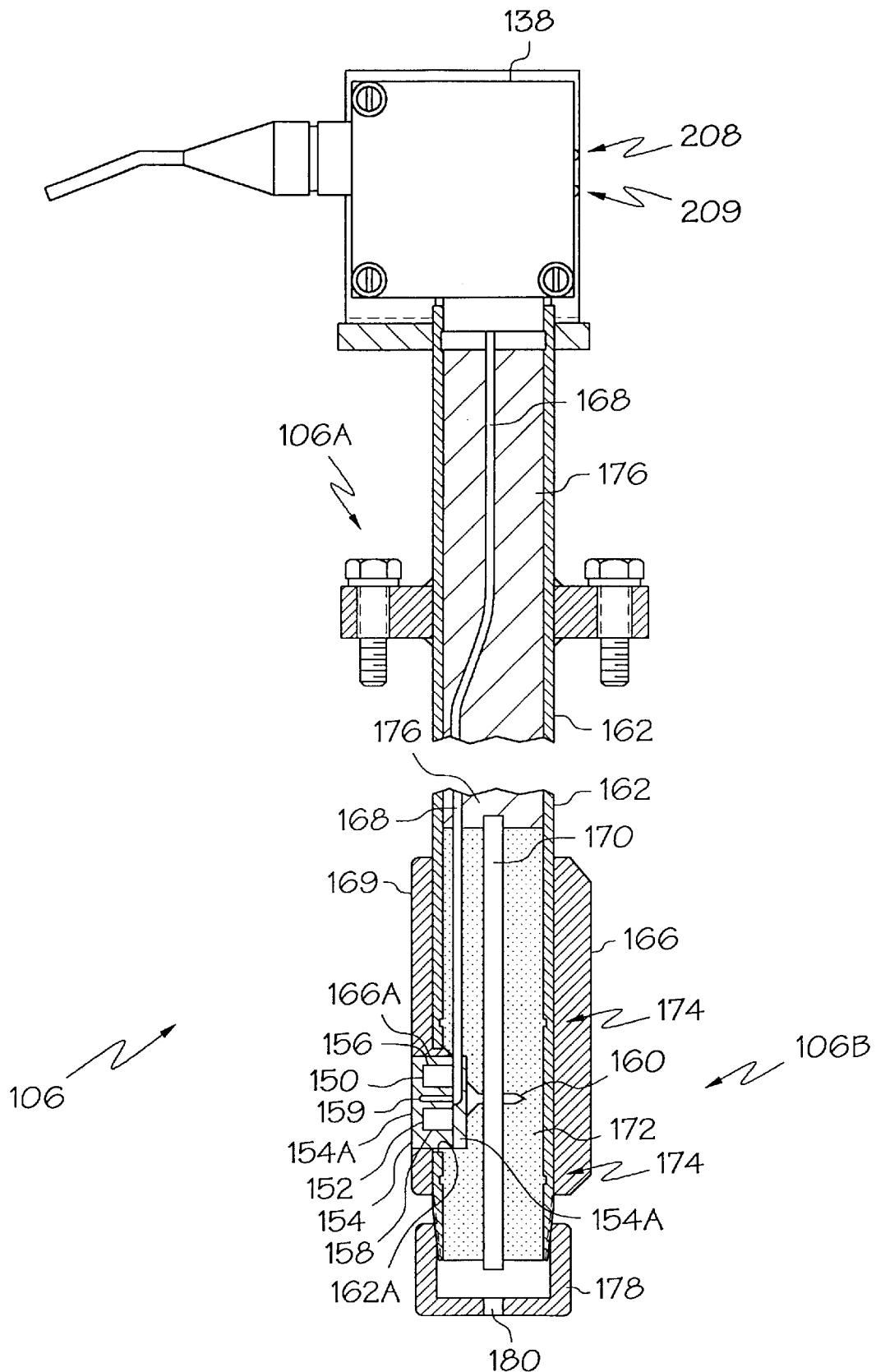
FIG. 3 is a partially sectioned side view of the ultrasonic probe of FIG. 2.

Applicants have recognized these problems of using an ultrasonic sensor in a centrifuge and have overcome them by means of the ultrasonic probe 106 which is mounted close to the outer surface of the maximum thickness charge wall 126 to be formed in the centrifugal machine 100 and well within a distance from the inner sidewall 128 which distance is less than a radius of the basket 108, see FIGS. 1, 2 and 3. The resulting short sound path is possible due to the selection of ultrasonic components which substantially reduce the deadband. The reduced deadband is in part due to high frequency ultrasonic energy pulse generation, for example at a frequency of 200 kHz, which permits a more rapid response time improving the measurement of the quickly moving and expanding charge wall 126.

The deadband of all ultrasonic sensors results, at least in part, due to the inability of pulse transmitters to turn off instantaneously. Instead, like all vibrating material, the transmitter continues to vibrate or "rings" for a short period of time after ultrasonic driving energy has been turned off. For detection of reflected ultrasonic energy pulses, the pulse transmitter must have been turned off and be sufficiently silent so that the sound receiver can accurately detect echoes. During the ringing period of the pulse transmitters, no measurements can be made because vibrations transmitted through the sensors, referred to as cross talk or cross coupling, will be detected rather than ultrasonic energy pulses traveling along the outside air measurement paths. The distance sound travels during this waiting period effectively determines the deadband distance. This aspect of the deadband has been addressed by the selection and mounting of an ultrasonic transmitter and receiver in the probe 106 as will be described.

The ultrasonic probe 106 has a proximal end 106A and a distal end 106B. The proximal end 106A of the probe 106 is attached to the top 122 of the cylindrical curb structure including the outer wall 124 which surrounds the basket 108. An ultrasonic transmitter 150 is mounted in the distal end 106B of the probe 106 and is directed toward the inner sidewall 128 of the basket 108. In a similar manner, an ultrasonic receiver 152 is mounted in the distal end 106B of the probe 106 and is also directed toward the inner sidewall 128 of the basket 108.

To reduce cross talk within the probe 106, the ultrasonic transmitter 150 and the ultrasonic receiver 152 are spaced from one another within the probe 106 and are mounted in a an ultrasonic energy and vibration damping material. In the illustrated embodiment of FIGS. 2 and 3, the damping material is formed as a mounting capsule 154 defining first and second cavities 156, 158 for receiving the ultrasonic transmitter 150 and the ultrasonic receiver 152, respectively. The capsule 154 also preferably defines a third decoupling cavity 159 interposed between the first and second cavities 156, 158 to better reduce the cross talk between the transmitter 150 and the receiver 152. The decoupling cavity 159 preferably is filled with air; however, appropriate isolation materials also may be used within the decoupling cavity 159. The decoupling cavity 159, whether filled with air or an isolation material, introduces interfaces having different acoustic impedances between the transmitter 150 and the receiver 152. In this way, not only are the vibrations of the transmitter 150 dampened by the damping material interposed between the transmitter 150 and the receiver 152 but also some portion of the vibrations are reflected back toward the transmitter 150 so that even less vibration reaches the receiver 152.

The mounting capsule 154 preferably is molded of silicon rubber with the transmitter 150 and the receiver 152 being inserted into the cavities 156, 158 in the capsule 154. As illustrated, the capsule 154 includes a backing portion 154A to which a screw 160 is secured. The mounting capsule 154 also defines a sensor face 154A which provides a sealed cover for the transmitter 150 and the receiver 152 to protect them from the harsh environment of the centrifugal machine 100.

The ultrasonic probe 106 includes a tubular body 162 which is preferably made of stainless steel. The probe control circuit housing 138 terminates the proximal end 106A of the probe 106 and a sleeve 166 is secured to the tubular body 162 at the distal end 106B of the probe 106 to define a sensing head. The sleeve 166 is preferably made of a polytetrafluoroethylene polymer. An electrical cable 168 extends between the transmitter and receiver 150, 152 and a probe control circuit located within the housing 138.

The capsule 154, with the transmitter 150 and receiver 152 positioned therein, is inserted into aligned apertures 166A and 162A within the sleeve 166 and the tubular body 162, respectively. The capsule 154 tapers slightly (~1°) so that the capsule 154 is frictionally and sealingly engaged with the aperture 166A of the sleeve 166 as the capsule 154 is inserted therein.

Once inserted to the point that the sensor face 154A is substantially flush with a flattened outside sensing face 169 of the sleeve 166, a drain tube 170 is held in its illustrated position as an epoxy is introduced into the distal end of the probe 106 to form an epoxy plug 172 which engages the interior of the distal end of the tubular body 162 and is retained in place by undercut rings 174 formed on the inside of the tubular body 162. The screw 160 and hence the capsule 154 are held in place in the probe 106 by the epoxy plug 172.

The remainder of the interior of the tubular body 162 is filled with an expanding foam 176 primarily to stabilize the cable 168 within the tubular body 162. The distal end 106b of the probe 106 is closed by a cap 178 which engages a threaded portion of the tubular body 162 and includes a drain hole 180. The epoxy used to form the epoxy plug 172 can be any of a wide variety of thermo setting polymeric resins and the expanding foam 176 can be any of a wide variety of polymeric foams including, for example, polyurethane and polyolefin foams. While a drainage system is shown in the illustrated embodiment of the invention, it should be apparent that a hermetically sealed probe can also e used and may be preferred.

A combination of design parameters were selected for the robe 106. In particular, a high frequency ultrasonic sound of approximately 200 Khz, a small sound generator of approximately 0.1 square inch area and the shortest sound path distance permissible, approximately 1.5 inches to 2.5 inches, to accurately and consistently measure the maximum depth of the charge wall 126 which is to be encountered in the centrifugal machine 100. The small surface area of the ultrasonic transmitter 150 results in a less massive device which has a more rapid response to the electric driving signal with reduced ringing. The receiver 152 is positioned a distance away from the transmitter 150 with a damping material formed about both the transmitter 150 and the receiver 152 to attenuate ringing and to reduce vibration transmission between the transmitter 150 and the receiver 152, i.e. cross talk, as described above.

The probe control circuitry within the housing 138 controls the transmitter 150 and receives signals from the receiver 152 such that it can determine the time intervals between pulse generation and pulse reflection or echo receipt. The time intervals are correlated to correspond to the thickness of the charge wall as it builds up in the basket 108 of the centrifugal machine 100. Time interval correlation can be performed by solution of an equation, by a look-up table or otherwise with a look-up table being appropriate for a centrifuge which is dedicated to a single centrifuging application such that a single wall thickness and operating procedure is consistently used.

In a working embodiment of the invention, the control circuitry is calibrated to transmit an analog current which is proportional to the thickness of the charge wall or load material and ranges from 20 mA when the basket 108 is empty to 4 mA when the basket is fully loaded with a maximum charge. The decreasing current signal for increasing basket charge is a fail safe arrangement in that for a system or power failure during loading, the loading controller 104 receives a current signal indicating that the basket is fully loaded and immediately closes the loading gate assembly 102. The probe control circuitry within the housing 138 is commercially available from Hyde Park Electronics, Inc. of Dayton, Ohio.

The loading gate assembly 102 is normally held tightly closed to prevent charge material from being dispensed from the supply tank 112. The movable gate member 130 is moved to and from open positions by rotation of a gate shaft 182 which is connected through crank arms 184 with fluid pressure cylinders 186 (only one shown) that move the arms 184 to turn the shaft 182. Gate member lifting arms 188 mounted on the shaft 182 are connected by links 190 (only one shown) to the crosshead member 134 and thus will move the movable gate member 130 along the facing plate 132 to an open position enabling charge material to flow through the spout 114. Under control of the loading controller 104, valves 192 pass fluid under pressure from a pressurized fluid source 194 via fluid lines 196, 198 to control the opening and closing of the movable gate member 130. An encoder 136, commercially available for example from Kytronics, is coupled to the gate shaft 182 to sense the angular position of the shaft 182 and produce a gate member position signal representing the position of the gate member 130.

In response to signals from the probe control circuitry within the housing 138 and the gate member position signal, the loading controller 104 controls the movable gate member 130. Control of the movable gate member can be effected as described in referenced U.S. Pat. No. 5,254,241. The loading controller 104 may also be embodied in a programmable logic controller (PLC) or in one of a large variety of commercially available microprocessors.

Figure 4:
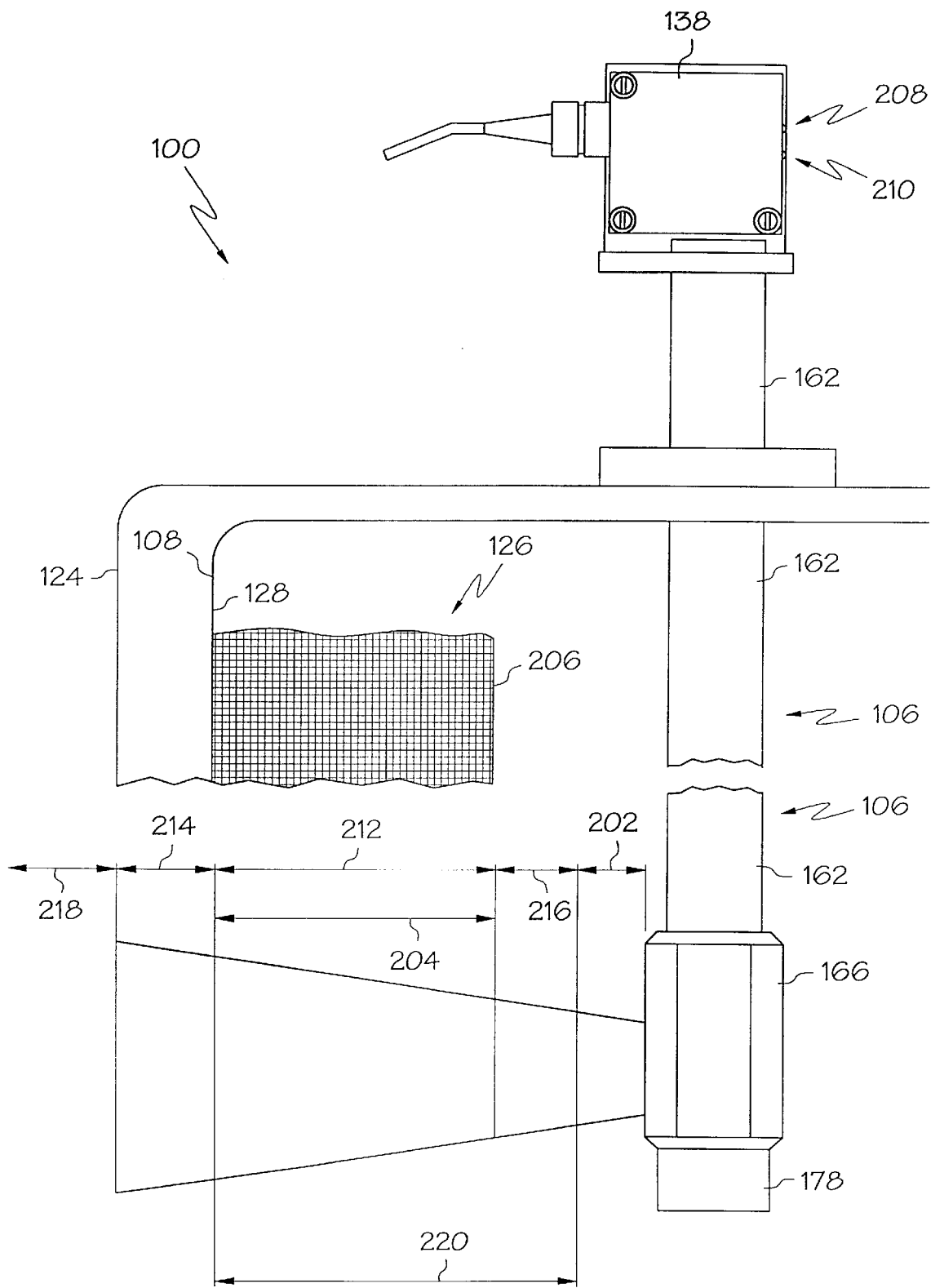
FIG. 4 schematically illustrates operation of the ultrasonic probe of the present invention in the centrifugal machine of FIG. 1.

Operation of the ultrasonic probe 106 will now be summarized with reference to FIG. 4 which schematically depicts the probe 106 within the centrifugal machine 100. The deadband of the probe 106 includes a range 202 of approximately 0–2.5 inches from the sensing face 169 of the sleeve 166 of the probe 106. The calibrated range 204 of the probe 106 extends from the inner sidewall 128 of the basket 108 (20 mA analog output signal) to the maximum charge wall thickness 206 (4 mA analog output signal). Distances beyond the inner sidewall 128 of the basket 108 and inside the maximum charge wall thickness 206 should not be encountered during normal operation of the centrifugal machine 100.

To advise an operator of the centrifugal machine 100 of the status of the operation of the probe 106, two light emitting diodes (LED's) 208, 210 extend through the outer sidewall of the housing 138. In the illustrated embodiment, the LED 208 is a red-light LED the brightness of which is controlled to indicate the relative value of the analog charge wall thickness signal. The LED 208 is substantially turned off for a full load and is illuminated substantially at maximum brightness for a zero load with the brightness of the LED 208 being generally linearly controlled between these two extremes to indicate the status of a building charge wall.

The LED 210 is a multicolor LED display which indicates the current sensing zone of the ultrasonic probe 106. In a working embodiment of the invention, light from the LED 210 is: green if sensing is being performed within an acceptable charge wall thickness range 212; amber if sensing is being performed within a zone 214 between the basket 108 and the outer wall 124; red if sensing is being performed within a zone 216 inwardly of the acceptable charge wall thickness range 212 or the deadband range 202; and, the LED 210 is turned off if sensing is being performed in a zone 218 beyond the outer wall 124 or if there is a loss of reflections or echoes of the ultrasonic energy pulses. The overall sensing range 220 for a working embodiment of the invention is from the deadband, approximately 2.0 inches from the probe 106, to the inner sidewall 128 of the basket 108, approximately 15.0 inches from the probe 106.

The effects of temperature, steam, water and water vapor on the speed of sound within the centrifugal machine 100 are greatly diminished by spacing the probe 106 in close proximity to a maximum charge wall which is to be formed within the centrifugal machine 100. In addition, the probe 106 can be calibrated to substantially overcome the effects of temperature, steam and water within the centrifugal machine 100 by measuring a calibration round trip time while the basket 108 is empty.

Since this is a known distance within the centrifugal machine 100, the probe control circuitry within the probe control circuit housing 138 divides a standard round trip time by the calibration round trip time to derive a calibration ratio. All subsequent time measurements made during the following loading cycle are then multiplied by the calibration ratio (standard round trip time/calibration round trip time) thereby substantially eliminating error due to changes in speed of sound due to temperature and the presence of steam, water and water vapor within the centrifugal machine. Preferably, calibration is performed for each loading cycle of the centrifugal machine 100.

Since ultrasonic measurements performed at a greater distance are more reliable if higher energy ultrasonic energy pulses are emitted from the probe 106, it is preferred to provide such higher energy ultrasonic pulses for making measurements to determine the calibration round trip times. Thus, lower energy, shorter ultrasonic energy pulses can be utilized during measurements of the charge wall while higher energy, longer ultrasonic energy pulses can be utilized during calibration measurements made to the inner sidewall 128 of the basket 108. The ultrasonic energy pulse widths can be changed depending on the application.

Pulse widths can also be controlled to approximately correspond to the distances of the measurements being performed. For example, maximum ultrasonic energy pulses can be used for calibration measurements with the pulse widths being reduced in defined steps, linearly or otherwise until minimum ultrasonic energy pulses are used for measurements near the maximum thickness charge wall. Also, ultrasonic energy pulses having different energy levels can be interleaved with one another with a selected one of the energy level pulses being used depending upon the measurement being made. Thus, pairs of high and low ultrasonic energy pulses can be emitted from the probe with the high energy pulses being used for calibration measurements and the low energy pulses being used for charge wall measurements. The forgoing description will suggest still other pulse energy control arrangements to those skilled in the art.

Having thus described the invention of the present application in detail and by reference to preferred embodiments thereof, it will be apparent that modifications and variations are possible without departing from the scope of the invention defined in the appended claims.

What is claimed is:

1. A method of determining the thickness of a charge wall being formed in a charge space along the inner sidewall of a rotating centrifugal basket of a centrifugal machine by charge material flowing into said basket, said method comprising the steps of:

positioning on ultrasonic probe within said basket;

activating said ultrasonic probe to direct ultrasonic energy outward from said ultrasonic probe toward a charge wall being formed along said inner sidewall of said basket;

receiving ultrasonic energy transmitted from said ultrasonic probe and reflected from said charge wall;

measuring a round trip time for said ultrasonic energy from when said ultrasonic energy is emitted from said probe to when said ultrasonic energy is received back by said probe after reflection from said charge wall; and utilizing said round trip time of said ultrasonic energy to determine the thickness of said charge wall.

2. A method of determining the thickness of a charge wall as claimed in claim 1 further comprising the step of operating said ultrasonic probe at a frequency of approximately 200 kHz.

3. A method of determining the thickness of a charge wall as claimed in claim 2 further comprising the step of locating said ultrasonic probe closely adjacent to a maximum acceptable thickness of said charge wall.

4. A method of determining the thickness of a charge wall as claimed in claim 3 further comprising the steps of:

locating an ultrasonic transmitter at a first position on said probe; and locating an ultrasonic receiver at a second position on said probe, said first and second positions being spaced from one another to reduce cross talk between said ultrasonic transmitter and said ultrasonic receiver.

5. A method of determining the thickness of a charge wall as claimed in claim 4 further comprising the step of mounting said ultrasonic transmitter and said ultrasonic receiver in ultrasonic energy damping material within said probe.

6. A method of determining the thickness of a charge wall being formed in a charge space along the inner sidewall of a rotating centrifugal basket of a centrifugal machine by charge material flowing into said basket, said method comprising the steps of:

positioning an ultrasonic probe within said basket, said probe having an ultrasonic transmitter located at a first position thereon and an ultrasonic receiver located at a second position thereon, said first and second positions being spaced from one another and said probe being positioned within said basket closely adjacent to a maximum acceptable thickness of said charge wall;

mounting said ultrasonic transmitter and said ultrasonic receiver in ultrasonic energy damping material within said probe;

operating said ultrasonic probe at a frequency of approximately 200 kHz to direct ultrasonic energy toward a charge wall being formed along said inner sidewall of said basket;

receiving ultrasonic energy reflected from said charge wall;

measuring a round trip time for said ultrasonic energy from when said ultrasonic energy is emitted from said probe to when said ultrasonic energy is received back by said probe after reflection from said charge and utilizing said round trip time of said ultrasonic energy to determine the thickness of said charge wall; and forming said ultrasonic energy damping material to cover said ultrasonic transmitter and said ultrasonic receiver within said probe.

7. A method of determining the thickness of a charge wall as claimed in claim 6 further comprising the steps of:

measuring a calibration round trip time for said ultrasonic energy when said centrifugal basket is empty; and calibrating said ultrasonic probe based on said calibration round trip to compensate for ambient conditions within said centrifugal basket.

8. Apparatus for determining the thickness of a charge wall being formed in a charge space along the inner sidewall of a centrifugal basket rotating within a curb structure of a centrifugal machine by charge material flowing into said basket, said apparatus comprising:

a probe having a proximal end connected to said curb structure and a distal end extending into said basket, said distal end of said probe being spaced from said charge space;

an ultrasonic transmitter mounted in said distal end of said probe and being positioned to direct ultrasonic energy toward a charge wall being formed in said charge space along said inner sidewall;

an ultrasonic receiver mounted in said distal end of said probe and being positioned to receive ultrasonic energy reflected from said charge wall being formed in said charge space along said inner sidewall; and a probe control circuit for energizing said transmitter to transmit bursts of ultrasonic energy toward said charge wall, for sensing receipt of said bursts of ultrasonic energy reflected by said charge wall and received by said receiver, for determining the time interval between transmission and receipt of said bursts of ultrasonic energy, and for determining a distance from said probe to said charge wall corresponding to said time interval.

9. Apparatus for determining the thickness of a charge wall as claimed in claim 8 wherein said ultrasonic transmitter and said ultrasonic receiver are spaced from one another within said probe.

10. Apparatus for determining the thickness of a charge wall as claimed in claim 9 wherein said ultrasonic transmitter and said ultrasonic receiver are mounted in a vibration damping material.

11. Apparatus for determining the thickness of a charge wall as claimed in claim 10 wherein said damping material comprises a mounting capsule defining first and second cavities for receiving said ultrasonic transmitter and said ultrasonic receiver, respectively.

12. Apparatus for determining the thickness of a charge wall being formed in a charge space along the inner sidewall of a centrifugal basket rotating within a curb structure of a centrifugal machine by charge material flowing into said basket, said apparatus comprising:

a probe having a proximal end connected to said curb structure and a distal end extending into said basket, said distal end of said probe being spaced from said charge space;

an ultrasonic transmitter mounted in said distal end of said probe and being directed toward said inner sidewall;

an ultrasonic receiver mounted in said distal end of said probe and being directed toward said inner sidewall, said transmitter and receiver being spaced from one another within said probe and mounted in a vibration damping material comprising a mounting capsule defining first and second cavities for receiving said ultrasonic transmitter and said ultrasonic receiver, respectively, said mounting capsule defining a sensor face directed outwardly from said probe, said sensor face sealingly covering said ultrasonic transmitter and said ultrasonic receiver; and a probe control circuit for energizing said transmitter to transmit bursts of ultrasonic energy toward said inner sidewall, for sensing receipt of said bursts of ultrasonic energy reflected by said charge space and received by said receiver, for determining the time interval between transmission and receipt of said bursts of ultrasonic energy, and for determining a distance from said probe to said charge wall corresponding to said time interval.

13. Apparatus for determining the thickness of a charge wall as claimed in claim 12 wherein said mounting capsule defines a third decoupling cavity interposed between said first and second cavities.

14. Apparatus for determining the thickness of a charge wall as claimed in claim 13 wherein said probe is mounted at a distance from said inner sidewall which is less than a radius of said basket.

15. Apparatus for determining the thickness of a charge wall as claimed in claim 14 wherein said probe is mounted at a distance of approximately 2.0 inches from a maximum charge wall to be formed in said a charge space of said rotating centrifugal basket.

16. Apparatus for determining the thickness of a charge wall being formed in a charge space along the inner sidewall of a centrifugal basket rotating within a curb structure of a centrifugal machine by charge material flowing into said basket, said apparatus comprising:

a probe having a proximal end connected to said curb structure and a distal end extending into said basket, said probe comprising a tubular body extending between said proximal end and said distal end of said probe;

an ultrasonic transmitter mounted in said distal end of said probe and being positioned to direct ultrasonic energy toward a charge wall being formed in said charge space along said inner sidewall;

an ultrasonic receiver mounted in said distal end of said probe and being positioned to receive ultrasonic energy reflected from said charge wall being formed in said charge space along said inner sidewall; and a probe control circuit for energizing said transmitter to transmit bursts of ultrasonic energy toward said charge wall, for sensing receipt of said bursts or ultrasonic energy reflected by said charge wall and received by said receiver, for determining the time interval between transmission and receipt of said bursts of ultrasonic energy, and for determining a distance from said probe to said charge wall corresponding to said time interval.

17. Apparatus for determining the thickness of a charge wall as claimed in claim 16 wherein said probe further comprises a sleeve secured to said tubular body at said distal end of said probe, said ultrasonic transmitter and said ultrasonic receiver being mounted within said sleeve.

18. Apparatus for determining the thickness of a charge wall as claimed in claim 17 wherein said tubular body and said sleeve define aligned apertures therethrough and said ultrasonic transmitter and said ultrasonic receiver are mounted within said aligned apertures.

19. Apparatus for determining the thickness of a charge wall as claimed in claim 18 wherein said ultrasonic transmitter and said ultrasonic receiver are mounted in vibration damping material.

20. Apparatus for determining the thickness of a charge wall as claimed in claim 19 wherein said damping material comprises a mounting capsule defining first and second cavities for receiving said ultrasonic transmitter and said ultrasonic receiver, respectively.

21. Apparatus for determining the thickness of a charge wall being formed in a charge space along the inner sidewall of a centrifugal basket rotating within a curb structure of a centrifugal machine by charge material flowing into said basket, said apparatus comprising:

a probe having a proximal end connected to said curb structure and a distal end extending into said basket, said probe comprising a tubular body extending between said proximal end and said distal end of said probe;

an ultrasonic transmitter mounted in said distal end of said probe and being directed toward said inner sidewall;

an ultrasonic receiver mounted in said distal end of said probe and being directed toward said inner sidewall;

a sleeve secured to said tubular body at said distal end of said probe, said tubular body and said sleeve defining aligned apertures therethrough and said ultrasonic transmitter and said ultrasonic receiver being mounted within said aligned apertures in vibration damping material which comprises a mounting capsule defining first and second cavities for receiving said ultrasonic transmitter and said ultrasonic receiver, respectively, said capsule defining a sensor face directed outwardly from said probe, said sensor face sealingly covering said ultrasonic transmitter and said ultrasonic receiver; and a probe control circuit for energizing said transmitter to transmit bursts of ultrasonic energy toward said inner sidewall, for sensing receipt of said bursts or ultrasonic energy reflected by said charge space and received by said receiver, for determining the time interval between transmission and receipt of said bursts of ultrasonic energy, and for determining a distance from said probe to said charge wall corresponding to said time interval.

22. Apparatus for determining the thickness of a charge wall as claimed in claim 21 wherein said mounting capsule defines a decoupling cavity interposed between said first and second cavities.

23. Apparatus for determining the thickness of a charge wall as claimed in claim 22 wherein said mounting capsule is retained within said probe by engaging said aperture in said sleeve.

24. Apparatus for determining the thickness of a charge wall as claimed in claim 23 further comprising a cap closing said tubular body and defining a drain therethrough.

25. Apparatus for determining the thickness of a charge wall as claimed in claim 24 wherein said sleeve is made of a polytetrafluoroethylene polymer.

26. A method of determining the thickness of a charge wall being formed in a charge space along the inner sidewall of a rotating centrifugal basket of a centrifugal machine by charge material flowing into said basket, said method comprising the steps of:

positioning an ultrasonic probe having a proximal end and a distal end within said basket, said proximal end of said probe being secured to said centrifugal machine and said distal end of said probe extending into said basket, said probe including an ultrasonic transmitter and an ultrasonic receiver closely spaced to said ultrasonic transmitter;

activating said ultrasonic transmitter to emit ultrasonic energy from said distal end of said probe toward a charge wall being formed along said inner sidewall of said basket;

receiving ultrasonic energy at said distal end of said probe, said received ultrasonic energy being transmitted from said ultrasonic transmitter and reflected from said charge wall;

measuring a round trip time for said ultrasonic energy from when said ultrasonic energy is emitted from said transmitter to when said ultrasonic energy is received back by said receiver after reflection from said charge wall; and utilizing said round trip time of said ultrasonic energy to determine the thickness of said charge wall.

27. A method of determining the thickness of a charge wall as claimed in claim 26 wherein said step of activating said ultrasonic probe to direct ultrasonic energy toward a charge wall being formed along said inner sidewall of said basket comprises directing ultrasonic energy directly toward said charge wall.

28. A method of determining the thickness of a charge wall as claimed in claim 27 further comprising the step of mounting said ultrasonic transmitter and said ultrasonic receiver in said distal end of said ultrasonic probe.

29. Apparatus for determining the thickness of a charge wall being formed in a charge space along the inner sidewall of a centrifugal basket rotating within a curb structure of a centrifugal machine by charge material flowing into said basket, said apparatus comprising:

a probe having a proximal end connected to said curb structure and a distal end extending into said basket, said distal end of said probe being spaced from a maximum dimension of said charge wall being formed in said charge space;

an ultrasonic transmitter mounted in said probe to transmit ultrasonic energy from said distal end of said probe toward said charge wall;

an ultrasonic receiver mounted in said probe to receive ultrasonic energy received at said distal end of said probe after reflection from said charge wall; and a probe control circuit for energizing said transmitter to transmit ultrasonic energy from said distal end of said probe toward said charge wall, for sensing receipt of reflections of said ultrasonic energy transmitted by said transmitter and reflected from said charge wall by said receiver, for determining the time interval between transmission and receipt of said ultrasonic energy, and for determining a distance from said probe to said charge wall corresponding to said time interval.

30. Apparatus for determining the thickness of a charge wall as claimed in claim 29 wherein said ultrasonic transmitter is mounted in said distal end of said probe.

31. Apparatus for determining the thickness of a charge wall as claimed in claim 29 wherein said ultrasonic receiver is mounted in said distal end of said probe.

32. Apparatus for determining the thickness of a charge wall as claimed in claim 29 wherein said ultrasonic transmitter is mounted in said distal end of said probe and said ultrasonic receiver is mounted in said distal end of said probe.

* * * * *

UNITED STATES PATENT AND TRADEMARK OFFICE
CERTIFICATE OF CORRECTION

PATENT NO : 5,897,786
DATED : April 27, 1999
INVENTOR(S) : Henkel et al.

It is certified that error appears in the above-identified patent and that said Letters Patent is hereby corrected as shown below:

Col. 10, line 49 "positioning on ultrasonic" should read --positioning an ultrasonic--.

Signed and Sealed this

Twelfth Day of October, 1999

Q. TODD DICKINSON

Attest:

*Attesting Officer*          *Acting Commissioner of Patents and Trademarks*